Patented Apr. 11, 1944

2,346,622

UNITED STATES PATENT OFFICE 2,346,622

REMOVER FOR PAINT, VARNISH, AND THE LIKE

Leo V. Steck, Piedmont, Calif., assignor to Shell Development Company, San Francisco, Calif., a corporation of Delaware No Drawing. Application March 2, 1942, Serial No. 433,029

8 Claims. (Cl. 252—168)

This invention relates to compositions for the solvation of coating materials such as paint, varnish, lacquer, gum, resins, rubber, asphaltic material and the like. More particularly, the invention provides novel compositions comprising or consisting of 2-chlorobutene-2, alone or in combination with other organic chlorides, which compositions are inexpensive and highly effective in the removal or loosening of finishes, coatings, or deposits of the above outlined character from various types of supporting surfaces. For certain purposes and in particular combinations, the solvent compositions of the invention are more effective solvents for use in paint, varnish and lacquer removers than many solvent components or compositions now in use.

Accordingly, it is an object of the present invention to provide compositions of paint removers, cleaners and the like which are more readily obtainable, cheaper and/or more effective than currently used solvent compositions. Other objects and advantages will be apparent from the following description.

It has now been found that 2-chlorobutene-2 is a valuable and efficient solvent for substances soluble in chlorinated hydrocarbons and in particular for coating materials such as paints, varnish, lacquer, resins, rubber, gums, asphaltic material and the like. The 2-chlorobutene-2 solvent may also contain various amounts of other organic chlorides as, for example, 1,2,3-trichlorobutane. The 2-chlorobutene-2, either alone or in combination with 1,2,3-trichlorobutane, may be used as a solvent in compositions for the removal of coatings of paint, varnish, lacquer, rubber, asphaltic material, etc., or may be used to replace in whole or in part the more expensive solvents such as acetone, methyl ethyl ketone, esters such as amyl acetate, butyl acetate, etc., benzol, ethylene dichloride and the like in the formulas of many currently used paint removers, cleaners and the like. In this connection a particular advantage of 2-chlorobutene-2 as a solvent for substances more or less soluble in chlorinated hydrocarbons, is its ready miscibility with other solvent materials.

In general, in solvents comprising a chlorinated hydrocarbon of the type of ethylene dichloride, the functions of this hydrocarbon may be performed by 2-chlorobutene-2, or by a combination of 2-chlorobutene-2 and 1,2,3-trichlorobutane. By a "corresponding amount" is meant a substantially equivalent proportion by weight or a portion of such amount as to function with substantially the same degree of solvation effectiveness.

Tests have shown that 2-chlorobutene-2 is less toxic than ethylene dichloride, both on inhalation and through the skin. It has even been proposed for use as an anthelmintic. Provided reasonable precautions are taken, it may be considered a safe industrial solvent. 1,2,3-trichlorobutane, while somewhat more toxic than 2-chlorobutene-2, may also be considered safe provided prolonged exposure to its vapors, particularly while hot, is avoided and it is not allowed to come on the skin.

General paint removers in current use often contain an aromatic compound such as benzol, naphthol, cresol, or toluol, which is a solvent for oils and resins and the links; a ketone, ether or ester to dissolve lacquer, nitrocellulose films and the like; a wax or other film forming compound; and often an alcohol which serves in large part as a diluent. The solvent or solvents serve to soften the surface coating and the paraffin wax prevents excessive evaporation losses of the solvent and keeps the solvent in contact with the coating by depositing a wax membrane on the surface of the paint remover film as the solvent evaporates.

Ketones, for example, are widely used and are present in many paint removers because they attack many types of surface coatings rapidly. These more expensive ketones and blends containing them can be entirely replaced by 2-chlorobutene-2, either alone or in admixture with other organic chlorides, such as 1,2,3-trichlorobutane, which mixtures predominate in or contain a substantial amount of 2-chlorobutene-2.

As an illustration of such mixtures removers were prepared identical in composition to three commercially used paint removers except that acetone or acetone together with amyl acetate contained in the known removers was replaced by an equal weight of the hereinafter designated organic chlorides. The paint removers containing acetone or acetone and amyl acetate included three removers, which have been widely used in the industry for many years. These removers designated herein as Removers 1, 2, and 3 have the following composition:

*Composition of current removers (percent by weight)*

|  | Remover No. 1 | Remover No. 2 | Remover No. 3 |
|---|---|---|---|
|  | Per cent | Per cent | Per cent |
| Acetone | 18.5 | 18.5 | 32.4 |
| Methyl ethyl ketone | 21 |  |  |
| Amyl acetate |  | 21 |  |
| Ethyl alcohol CO3A |  |  | 32.4 |
| Benzol | 40.4 | 40.4 | 32.4 |
| Methyl alcohol | 16.7 | 16.7 |  |
| Paraffin wax | 3.4 | 3.4 | 2.9 |

The removers containing the organic chlorides as indicated in the following table, the Removers Nos. 1 and 2, and another unsubstituted commercial remover designated as Remover No. 4 were applied to 4" x 8" steel panels coated with various finishes and to the finish on a black automobile fender (said to be an alkyl resin dried by infra-red baking).

The removers were applied and tested using the method described in Federal Specification TT-R-251. This method is described as follows: "Place the selected coated wood and metal panels in a nearly vertical position and brush on one area of each the thoroughly mixed sample to be tested and immediately thereafter apply with another brush the same quantity of the comparison mixture to similar areas at other places on the two panels. Let each stand for the same time (not less than 5 nor more than 20 minutes) after application and scrape off the softened paint or varnish. Note whether the delivery removes the coating as effectively as the comparison mixture and note whether the wood is stained to a greater extent by the delivery than by the comparison mixture."

The observations from these tests are given in the following table and may be summarized as follows:

The composition with 2-chlorobutene-2 substituted for acetone in the formula of Remover No. 1 is as effective as Removers Nos. 1 and 2 and 4 and in some instances is superior.

The composition with 2-chlorobutene-2 replacing acetone and 1,2,3-trichlorobutane replacing amyl acetate in the formula of Remover No. 2 is generally as effective, although somewhat slower than Removers Nos. 1 and 2 and compares favorably with Remover No. 4.

Similarly, it has been found, according to the present invention, that 2-chlorobutene-2 can be used in place of benzol in removers for paint and the like. This substitution was tried, for instance, in the formula of Remover No. 1 (the composition of which is given above) and the action compared with that of Remover No. 1 and with that of a remover described by Federal Specification TT-R-251 which is constituted as follows:

| Ingredients | Parts by weight |
|---|---|
| Acetone (U. S. P.) | 25 |
| 95% ethyl alcohol (U. S. P.) | 25 |
| Benzol (U. S. P.) | 50 |
| Paraffin (U. S. P.) (M. P. approx. 55° C.) | 3 |

These removers were applied according to the above quoted method to metal panels coated with white enamel, to oak wood panels having a varnish coating at least several years old and to the finish of an automobile fender.

With the remover containing 2-chlorobutene-2 the white enamel was lifted from the metal panel a little slower than with the other two removers, but after 20 minutes the film was easily scraped off.

All three removers lifted the varnish coat from the oak panels immediately and it was easily scraped off. The action of the substituted remover on the auto fender was somewhat slower than that of the other two removers, but the film

*Comparative effectiveness of paint removers*

| Paint remover | Maroon Kem art metal finish | | | Ivory Kem art metal finish | | | Light green Kem baking enamel | | | White urea-alkyd enamel | | |
|---|---|---|---|---|---|---|---|---|---|---|---|---|
| | Film begins to lift | Entire film lifted | Entire film rubs off | Film begins to lift | Entire film lifted | Entire film rubs off | Film begins to lift | Entire film lifted | Entire film rubs off | Film begins to lift | Entire film lifted | Entire film rubs off |
| | Minutes | Minutes | | Minutes | Minutes | | Minutes | Minutes | | Minutes | Minutes | |
| Remover No. 4 | | 1 | Yes | | 1 | Yes | | 1 | Yes | 10 | | No |
| Remover No. 1 | | 1 | Yes | | 1 | Yes | 1 | 5 | Yes | 3 | 10 | Yes |
| 2-chlorobutene-2 for acetone in Remover No. 1 | | 1 | Yes | | 1 | Yes | | 2 | Yes | 1 | | Yes |
| Remover No. 2 | | 1 | Yes | | 1 | Yes | 1 | | No | 5 | | Yes |
| 2-chlorobutene-2 for acetone, trichlorobutane for amyl acetate in Remover No. 2 | 1 | 3 | Yes | 1 | 5 | Yes | 1 | 5 | Yes | 10 | | No |
| 2-chlorobutene-2 for acetone, polychlorides for amyl acetate in Remover No. 2 | 1 | 3 | Yes | 1 | 10 | Yes | 1 | 5 | Yes | 2 | 10 | Yes |
| 2-chlorobutene-2 for acetone and amyl acetate in Remover No. 2 | 1 | 3 | Yes | 1 | | Yes | 1 | 10 | Yes | | | No |
| 2-chlorobutene-2 for acetone in Remover No. 3 | 1 | 3 | Yes | 1 | 10 | Yes | 1 | 10 | Yes | | | No |

*Comparative effectiveness of paint removers—Continued*

| Paint remover | Zinc chromate primer | | | Clear sanitary baking varnish | | | Auto body finish | | |
|---|---|---|---|---|---|---|---|---|---|
| | Film begins to lift | Entire film lifted | Entire film rubs off | Film begins to lift | Entire film lifted | Entire film rubs off | Film begins to lift | Entire film lifted | Entire film rubs off |
| | Minutes | Minutes | | Minutes | Minutes | | Minutes | Minutes | |
| Remover No. 4 | | 2 | Yes | | 1 | Yes | 3 | | No |
| Remover No. 1 | | 2 | Yes | 1 | 5 | Yes | 3 | | No |
| 2-chlorobutene-2 for acetone in Remover No. 1 | 1 | 10 | Yes | | 1 | Yes | | | No |
| Remover No. 2 | 1 | 7 | Yes | 1 | 3 | Yes | | | No |
| 2-chlorobutene-2 for acetone, trichlorobutene for amyl acetate in Remover No. 2 | 1 | | Yes | 1 | 2 | Yes | | | No |
| 2-chlorobutene-2 for acetone, polychlorides for amyl acetate in Remover No. 2 | 1 | | Yes | 1 | 1 | Yes | | | No |
| 2-chlorobutene-2 for acetone and amyl acetate in Remover No. 2 | 1 | 10 | Yes | 1 | 2 | Yes | | | No |
| 2-chlorobutene-2 for acetone in Remover No. 3 | 3 | | Yes | | | No | | | No | began to lift from the primed surface in 5 minutes; after 20 minutes small areas of the top coat were lifted, the primer coat was softened and could be scraped to the metal.

While the use of 2-chlorobutene-2 as a solvent in the novel paint, varnish and lacquer removing compositions has been illustrated in the foregoing examples using exact amounts of it in combination with exact amounts of other solvents, it is to be understood that these proportions are in no way critical, but are used to show the relative efficiency of 2-chlorobutene-2 in performing the functions hitherto carried on by such solvents as ketones and benzol, the other components of the comparable removers remaining the same. It may be used in similar or different cleaning mixtures in analogous or different proportions which are adapted to the particular purpose to be accomplished.

An ideal remover for all types of finishes and supporting surfaces probably does not exist. A remover may work well on varnishes and enamels, but poorly on lacquers, and vice versa. Similarly a satisfactory remover for finishes on a metal base may not be suitable for the same finishes on wood. Other factors such as the chemical and physical nature of the film, the method of application, time of contact, etc., will have influence on the action of particular removers.

General film removers are not composed with the purpose of removing only one type of film, however, but rather several or as many types as practical; hence the presence of several types of components so that the mixture may have a wider utility. Also, frequently the several components of a given composition have a cumulative effect in attacking any kind of surface coating; that is, the non-specific components promote or aid the action of the specific components in attacking a particular type of film or deposit. Accordingly, if a remover is to be used exclusively for a single purpose, the relative proportions of the several components way well be determined for each such individual purpose, but if it is to be used as a general utility cleaner it will contain solvents adapted to various types of deposits as in the examples herein set out.

From a consideration of the above disclosure, it will be realized that any composition of matter for the solvation of paint, varnish, lacquer, surface films, rubber, gums, resins, asphalts and the like containing 2-chlorobutene-2 or both 2-chlorobutene-2 and 1,2,3-trichlorobutane is intended to be within the scope of this invention whether or not there are present therein other substances such as those listed in the specific examples.

The invention claimed is:

1. A paint and varnish remover comprising (by weight) approximately 40.4% 2-chlorobutene-2, 21.0% methyl ethyl ketone, 18.5% acetone, 16.7% methyl alcohol and 3.4% paraffin wax.

2. A paint and varnish remover comprising (by weight) approximately 18.5% 2-chlorobutene-2, 16.5% methyl alcohol, 21% methyl ethyl ketone, 40.5% benzol and 3.5% paraffin wax.

3. A paint and varnish remover comprising (by weight) approximately ⅓ 2-chlorobutene-2, ⅓ ethyl alcohol, ⅓ benzol and a small amount of paraffin wax.

4. A paint and varnish remover comprising (by weight) approximately 18.5% 2-chlorobutene-2, 21% 1,2,3-trichlorobutane, 40.5% benzol, 16.5% methyl alcohol and 3.5% paraffin wax.

5. A finish remover suitable for removing dried coats of paint, varnish and lacquer, containing 2-chlorobutene-2, an aromatic hydrocarbon and a film-forming compound.

6. A finish remover suitable for removing dried coats of paint, varnish and lacquer, containing major amounts of 2-chlorobutene-2 and of an aromatic hydrocarbon, and a minor amount of a film-forming compound.

7. A finish remover suitable for removing dried coats of paint, varnish and lacquer containing major amounts of 2-chlorobutene-2, 1,2,3-trichlorobutane, and an aromatic hydrocarbon, and a minor amount of a film-forming compound.

8. A finish remover suitable for removing dried coats of paint, varnish and lacquer containing 2-chlorobutene-2 and an aromatic hydrocarbon.

LEO V. STECK.